US006365123B1

(12) United States Patent
Narula et al.

(10) Patent No.: US 6,365,123 B1
(45) Date of Patent: Apr. 2, 2002

(54) SOL-GEL PROCESSED METAL-ZIRCONIA MATERIALS

(75) Inventors: Chaitanya Kumar Narula; Sabine Rita Nakouzi-Phillips, both of Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/541,223

(22) Filed: Apr. 3, 2000

Related U.S. Application Data

(62) Division of application No. 09/216,179, filed on Dec. 18, 1998, now Pat. No. 6,143,272.

(51) Int. Cl.⁷ .......................... C01G 25/02; B01J 23/00; C01B 35/48
(52) U.S. Cl. ........................ 423/608; 502/349; 501/104
(58) Field of Search ................................ 423/608, 635, 423/641, 213.2, 213.5, 239.1; 502/340, 344, 349; 501/12, 104

(56) References Cited

U.S. PATENT DOCUMENTS

| 4,668,299 A | 5/1987 | Nanao et al. |
| 4,791,091 A | 12/1988 | Bricker et al. |
| 4,902,655 A | 2/1990 | Snyder et al. |
| 5,130,114 A | 7/1992 | Igarashi |
| 5,134,107 A | 7/1992 | Narula |
| 5,200,384 A | 4/1993 | Funabiki et al. |
| 5,403,513 A | 4/1995 | Sato et al. |
| 5,403,807 A | 4/1995 | Narula |
| 5,534,237 A | * 7/1996 | Yoshida et al. ......... 423/239.1 |
| 5,538,931 A | 7/1996 | Heinrichs et al. |
| 5,747,410 A | * 5/1998 | Muramatsu et al. ....... 502/348 |
| 5,766,562 A | 6/1998 | Chattha et al. |
| 5,879,645 A | * 3/1999 | Park et al. ............... 423/213.2 |
| 6,083,868 A | * 7/2000 | Yoshida et al. ........... 502/304 |

FOREIGN PATENT DOCUMENTS

| EP | 0 613 714 A2 | 9/1994 |
| EP | 0 754 494 A | * 1/1997 |
| EP | 0 787 522 A | * 8/1997 |
| FR | 1459437 | 11/1966 |

OTHER PUBLICATIONS

"High Surface Area Platinum–Titania Aerogels: Preparation, Structural Properties, and Hydrogenation Activity", by M. Schneider et al, Journal of Catalysis 147, 500–514 (1994).

"Incorporation of Barium for the Synthesis of Heterometallic Alkoxides: Synthesis and Structures of $[BaZr_2(O^1Pr)_{10}]_2$ and $Ba[Zr_2(O^1Pr)_9]_2$" by Brian A. Vaarstra et al, Inorg. Chem., 1991, 30, 3068–3072, ©1991 American Chemical Society.

"Ring Opening of the $[Au(CH_2)_2PPh_2]_2X_4$ (X=Halogen) Metallacycle, Cleavage of $Au^{III}$–$CH_2$ Bonds", by Raphael G. Raptis et al, Inorg Chem., 1991, 30, 3072–3075, ©1991 American Chemical Society.

"Bimetallic Alkoxides of Barium and Zirconium: Preparation of $BaZrO_3$ Powder", by E/O. Turevskaya et al, Journal of Sol–Gel Science & Technology, vol. 8, 1997, pp. 111–115.

* cited by examiner

Primary Examiner—Steven P. Griffin
Assistant Examiner—Cam N. Nguyen
(74) Attorney, Agent, or Firm—Damian Porcari

(57) ABSTRACT

A metal-zirconium oxide material made by sol-gel techniques from alkoxides including heterometallic alkoxides. The heterometallic alkoxides include zirconium and another metal selected from alkali metals and alkaline earth metal. Optionally, in forming this material, heterometallic alkoxides of zirconium and lanthanide metal may be included during sol-gel processing, as well as mono-metal alkoxides of these metals or zirconium.

10 Claims, 1 Drawing Sheet

SOL-GEL PROCESSED METAL-ZIRCONIA MATERIALS

This is a divisional of application(s) Ser. No. 09/216,179, filed on Dec. 18, 1998, U.S. Pat. No. 6,143,272 issued Nov. 7, 2000

FIELD OF THE INVENTION

This invention is related to sol-gel manufactured metal-zirconium oxide materials. More particularly, these oxides are made from alkoxides including heterometallic alkoxides: zirconium-alkali metal alkoxides and/or zirconium-alkaline earth metal alkoxides and, optionally, zirconium-lanthanide alkoxides.

BACKGROUND OF THE INVENTION

In U.S. Pat. Nos. 5,134,107 and 5,403,807 commonly assigned herewith, sol-gel processed oxide materials are disclosed which are useful for catalysis in automotive exhaust gas systems. The oxide materials of the '807 patent contain alkaline earth metals and optionally lanthanides in an alumina matrix. It was disclosed that the sol-gel processing allows for the low temperature preparation of aluminum oxide materials of high purity and controlled microstructure with excellent high temperature stability. These materials can be in such forms as gels, aerogels and xerogels.

We have now found that zirconia based materials made by sol-gel techniques using heterometallic alkoxides to incorporate alkali metal and/or alkaline earth metal with the zirconium are excellent materials for use in automotive catalysis for example as catalyst supports or for NOx absorption.

Significant research has been undertaken in the treatment of exhaust gas generated by lean-burn engines which includes hydrocarbons, carbon monoxide and nitrogen oxides. In such lean-burn gasoline and diesel engines, the A/F ratio is higher than stoichiometry (oxidizing) which improves fuel economy. Since the exhaust is oxidizing, nitrogen oxides which must be reduced pose the most difficulty for conversion. One current approach to treating oxidizing exhaust gasses involves materials which act as NOx absorbents, i.e., materials which are able to absorb nitrogen oxides from the exhaust gas during lean-burn operation and then later release them when the oxygen concentration in the exhaust gas is reduced. For example, when the A/F ratio is made rich or stoichiometric. Conventional NOx absorbents are alkaline earth metals like barium with a precious metal catalyst like platinum carried on alumina. The widely held mechanism for this absorption phenomena is that during lean-burn operation the platinum first oxidizes NO to $NO_2$ and the $NO_2$ subsequently forms a nitrate complex with the trapping material, e.g., the barium. In the regeneration mode, under a stoichiometric or rich environment, the nitrate decomposes and the NOx released is reduced catalytically over the platinum with reducing species like HC or CO in the exhaust gas.

Such conventional absorbent materials have a serious deficiency in that the barium reacts with sulfur oxides generally present in exhaust gas to form barium sulfate. This inactivates the barium for NOx absorption. It is suggested that to decompose the barium sulfate it should be subjected to elevated temperatures of at least 600° C. or more in reducing gas conditions. One negative aspect of this regeneration process is that it leads to detrimental changes in the NOx absorbent such as reduced surface area and crystallization of the aluminate phases thereby reducing the efficiency of the NOx absorbent. Alkali metals like potassium have also been suggested as NOx absorbents, however, they are even more easily deactivated by sulfur than alkaline earth metals like barium. Repeated regeneration of the absorbent by heating, as discussed above, contributes to a loss of surface area in the alumina support material and contributes toward further sintering in the platinum precious metal responsible for the conversion of NOx to $NO_2$. Precious metal sintering results in a decrease in the active sites that convert NOx to $NO_2$, and hence a decrease in the total amount of NOx trapped on the available absorbent.

In commonly owned application entitled "Use of Sol-Gel Processed Alumina-Based Metal Oxides for Absorbing Nitrogen Oxides in Oxidizing Exhaust Gas" (U.S. Ser. No. 09/184,146, U.S. Pat. No. 6,217,837), we disclosed that sol-gel processed oxides particularly those made from heterometallic alkoxides like those of the '807 patent have excellent NOx trapping efficiency. We believe that this improved trapping performance of the sol-gel processed oxide material, as compared to conventional alumina impregnated with barium, is due to the atomic dispersion of barium in the alumina matrix due to the sol-gel process. It is also believed to increase the sulfur poisoning resistance in these alkoxide materials.

The present invention materials have superior NOx trapping ability when compared to similar formulations made instead by impregnating the metal such as alkali metal onto conventional zirconia. This NOx trapping ability operates under diesel and gasoline lean burn-NOx conditions. These and other advantages of the present invention materials will be discussed in detail below.

In U.S. application Ser. No. 09/134,992 filed Aug. 17, 1998, U.S. Pat. No. 6,129,989 issued Oct. 10, 2000, and entitled "NOx Trap Catalyst For Lean Burn Engines" commonly assigned with the present invention, a sol-gel oxide material is disclosed useful for NOx absorption. It comprises oxides of aluminum, magnesium and zirconium.

SUMMARY OF THE INVENTION

The invention is a metal-zirconium oxide material made by sol-gel techniques from alkoxides including heterometallic alkoxide comprising: (I) at least one heterometallic alkoxide selected from the group consisting of: (a) alkali metal-zirconium alkoxides having the general chemical formulas: $M[Zr(OR)_5]$, $M[Zr_2(OR)_9]$, $M_2[Zr_3(OR)_{14}]$, where M is an alkali metal; and (b) alkaline earth metal-zirconium alkoxides having the general chemical formulas: $M'[Zr_2(OR)_9]_2$ or $M'[Zr_3(OR)_{14}]$, where M' is an alkaline earth metal; and optionally, (II) lanthanide-zirconium alkoxides selected from the group consisting of: $Ln[Zr_2(OR)_9]_2$, where Ln is a lanthanide. The ratio of alkali metals, alkaline earth metals, and/or lanthanide to zirconia can be changed by including varying amounts of mono-metal alkoxides such as aluminum alkoxide, alkali metal alkoxide, alkaline earth metal alkoxide, or lanthanide alkoxide with the heterometallic alkoxide.

According to another aspect of the present invention, it is also directed to the method of making such preferred materials from the heterometallic alkoxides. Further it includes the sols, gels and subsequent xerogels, and aerogels so made as well as products made by calcining such materials. The materials are useful as catalyst supports, e.g., loaded with precious metals like platinum, particularly useful as NOx absorbents during lean-burn engine operation.

DETAILED DESCRIPTION OF PREFERRED EMBODIMENTS

Figure 1:
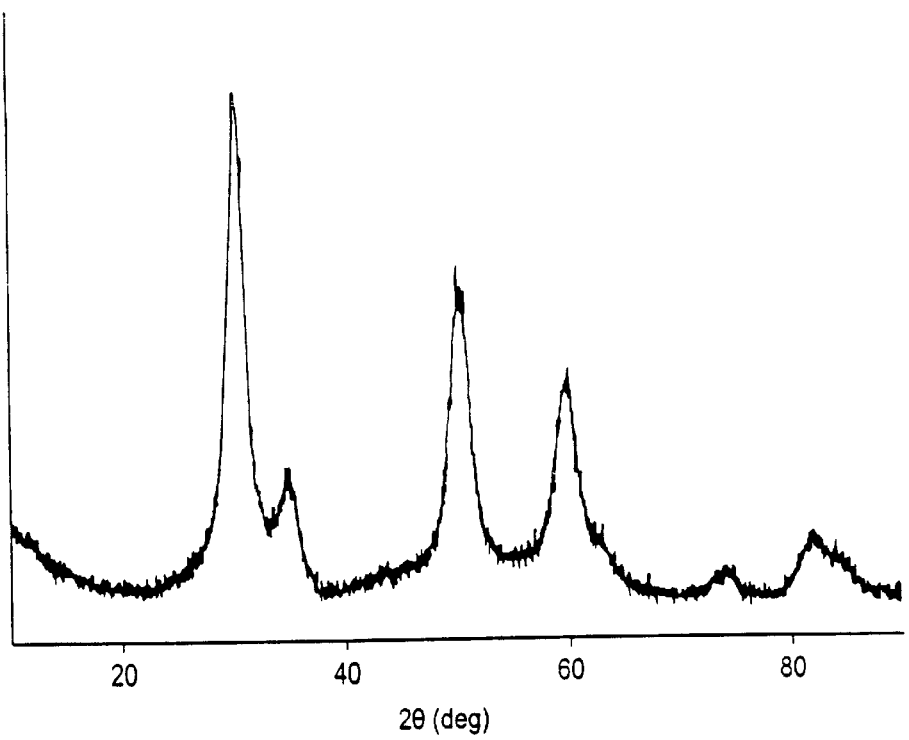
FIG. 1 is a graph showing X-ray powder diffraction of $BaO-ZrO_2$ that corresponds to a cubic phase of zirconia.

As disclosed above, the invention is directed to specific metal-zirconia materials where the metal is alkali metal, alkaline earth metal, or both of them. Optionally, lanthanide may be included as the metal. The materials are made from alkoxides including heterometallic alkoxides which are defined above and will be discussed in more detail below. These materials are useful as catalyst supports and particularly useful as NOx absorbents.

The technique of making the sol-solutions is well known to those skilled in the art. In the case of using alkoxides, it generally involves (1) hydrolysis of metal alkoxides in water and/or parent alcohol (acid or base can be used as catalyst if necessary) or (2) modification of metal alkoxides with organics such as acetyl-acetone and subsequent hydrolysis or (3) direct hydrolysis in water and peptization in the presence of acid. Additional discussions of sol-gel techniques as apply particularly to the present invention will be presented further below.

The novel invention materials are made from alkoxides including certain heterometallic alkoxides. The heterometallic alkoxides contain zirconium and another metal being alkali metal, alkaline earth metal or lanthanide metal. In making the material, the incorporation of lanthanide-zirconium heterometallic alkoxides is optional. At least one heterometallic alkoxide is employed selected from the group consisting of: (a) alkali metal-zirconium alkoxides having the general chemical formulas: $M[Zr(OR)_5]$, $M[Zr_2(OR)_9]$, $M_2[Zr_3(OR)_{14}]$, where M is an alkali metal; (b) alkaline earth metal-zirconium alkoxides having the general chemical formulas: $M'[Zr_2(OR)_9]_2$ or $M'[Zr_3(OR)_{14}]$, where M' is an alkaline earth metal. Lanthanide-zirconium alkoxides optionally employed are selected from the group consisting of: $Ln[Zr_2(OR)_9]_2$, where Ln is a lanthanide. The ratio of alkali metals, alkaline earth metals, and/or lanthanide to zirconia can be changed by including varying amounts of mono-metal alkoxides such as aluminum alkoxide, alkali metal alkoxide, alkaline earth metal alkoxide, or lanthanide alkoxide with the heterometallic alkoxide.

Alkali metal is meant to include such metals as lithium (Li), sodium (Na), potassium (K), rubidium (Rb), and cesium (Cs). Alkaline earth metal is meant to include such metals as magnesium (Mg), calcium (Ca), strontium (Sr), and barium (Ba). Lanthanide is meant to include members of the lanthanide series of the Periodic Table such as lanthanum (La) and cerium (Ce). As would be apparent to one skilled in the art in view of the present disclosure, more than one such heterometallic alkoxide could be employed. That is, e.g., lithium-zirconium alkoxide and barium-zirconium alkoxide could be employed.

In the final oxide invention material, (a) zirconium oxide and (b) the total of alkali metal oxide and/or alkaline earth metal oxide are preferably present in weight percents respectively of (a) 20–80 wt % and (b) 80–20 wt. %. When lanthanum oxide is present, it is included in 10–50 wt. % (based on a total of 100 wt. % of these three oxides in the product). More preferably, in the product oxide, these weight percents are 87–40 wt. %, 3–30 wt. %, and 10–30 wt. % of these three oxides, respectively.

Advantageously, in these materials, the metal like alkali metal, for example, is seen to be uniformly distributed throughout the zirconia matrix and chemically linked into the zirconia by bridges such as metal-oxygen-zirconium or metal-hydroxide-zirconium. More specifically, the special advantages for NOx absorption of using heterometallic alkoxides is believed by the inventors to be the result of the molecular distribution of alkali metals, alkaline earths and lanthanides. Such distribution further improves the thermal stability of sol-gel processed materials as compared with those prepared from a mixture of mono-metallic alkoxides.

Also we found that the invention materials have a higher surface area than materials made conventionally from mixtures of oxides like zirconium oxide, alkali metal oxide, and optionally lanthanum oxide or their precursors, e.g., nitrates, chlorides, etc. This increased surface area is advantageous, e.g., when the material is employed for catalysis as for a catalyst support or NOx absorption.

In its broadest embodiment, the product metal-zirconia materials are made by reacting water and alkoxides, which sol-gel techniques are described in detail in U.S. Pat. No. 5,403,807 incorporated expressly herein by reference. Using such techniques, for example, a barium-zirconium-oxide material according to the present invention can be made from alkoxides including $Ba[Zr_2(OR)_9]_2$ and water. As with any such material made according to the present invention, the ratio of alkali metals, alkaline-earth metals and/or lanthanide to zirconia can be changed by including varying amounts of one or more mono-metal alkoxides like zirconium alkoxide, alkaline earth alkoxides, alkali metal alkoxide, and lanthanide alkoxides with the heterometallic alkoxide. Thus the ratio of, e.g., Ba to zirconia is changed, according to the above example, by mixing $Zr(OPr^i)_3$ with $Ba[Zr_2(O^iPr)_9]_2$. A barium lanthanum-zirconia, e.g., may be prepared from a mixture of $Ba[Zr_2(O^iPr)_9]_2$, $La(OR)_3$ and $Zr(OR)_4$.

Sol-gel technology is widely known and most commonly comprises reacting water and an alkoxide having hydrolyzable alkoxy groups. Any such technology may be used to make the preferred materials. Preferred sol-gel methods for making the novel metal zirconia materials according to the present invention are detailed below. Still others considered within the scope of the invention will be apparent to those skilled in the art in view of the present disclosure.

In one embodiment of the present invention for forming metal-zirconia materials, an alkali metal-zirconium oxide material is formed from a heterometallic alkoxide including the steps of forming a reaction mixture from $M'[Zr_2(OPr^i)_9]$, M'=Li, Na, K, and water, maintaining the reaction mixture at elevated temperature, removing isopropanol and water from the reaction mixture, and collecting the xerogel. According to another embodiment of the present invention, an alkali metal-alkaline earth-zirconium oxide material is formed from heterometallic alkoxides including the steps of forming a reaction mixture with the alkoxides and water, maintaining the reaction mixture at elevated temperature, removing alcohol and water from the reaction mixture, and collecting the produced xerogel.

The metal-zirconium oxide material may include minor proportions of other materials to stabilize or otherwise enhance the oxide properties. Stabilizer materials such as silica commonly included in oxide materials to be used at elevated temperatures would also be useful herein. When included they would be used in an amount up to about 10 wt. % based on the total weight of the zirconia-based metal oxide.

If the present invention material is to be used as a NOx absorbent, the material would include precious metal which would either be deposited on the material or included with the components during sol-gel processing. The use of this material for NOx trapping is the subject of concurrently filed U.S. application Ser. No. 09/216,459, U.S. Pat. No. 6,139, 813 entitled "NOx Trapping by Metal-Zirconia Materials During Lean-Burn Automotive Engine Operation". Under lean-burn conditions, where the exhaust gas containing hydrocarbons, carbon monoxide, and nitrogen oxides contains more oxygen than is required for oxidizing components to be oxidized in the exhaust gas, nitrogen oxides are absorbed on the metal oxide material. And when the oxygen concentration in the gas is lowered, the absorbed nitrogen oxides are desorbed from the metal oxide and reduced over the precious metal. For use in absorbing NOx as disclosed above, the oxide material would include a precious metal like platinum, palladium, or rhodium or a mixture of any of them. The precious metal can be loaded on the oxide material or incorporated within the sol-gel material during processing. For example, incipient wetness techniques may be used where the oxide material can be contacted with, e.g., hexachloroplatinic acid solution to deposit platinum. The impregnated product would be dried and calcined generally before use. Alternately, the platinum could be included in the sol as, e.g., platinum 2-ethyl hexanoate. In this case, rather than the platinum being merely loaded on the metal oxide it would be included within the metal oxide.

The precious metal when included in the zirconia-based metal oxide is incorporated in an amount of at least 0.1 wt. % based on the total weight of the oxide metal-zirconium oxide material. Preferably, the precious metal is employed in an amount of 0.1 to 5 wt. % based on the weight of the oxide, more preferably being included in about 1 to 2 wt. %. For wet impregnation, as one example, the precious metal may be provided from soluble precious metal compounds. Water soluble compounds are preferred, including, but not limited to nitrate salts. In addition to this incorporation from a liquid phase, the precious metal, e.g., platinum, may be provided by sublimation of platinum chloride or other volatile platinum salts: by solid state exchange in the 300–500° C. temperature range using labile platinum compounds. Platinum is the preferred precious metal, however, when platinum is included other precious metal like rhodium in relatively small amounts is desirably also added, optimally as 1–5 wt. % rhodium based on the weight of the support. Rhodium is desirably included since it provides a broadening of the NOx conversion window due to increased conversion efficiency of nitrogen oxides at nigher temperatures.

For useful application as a catalyst support, or as a NOx absorbent material in an exhaust system as disclosed herein, a coating of this material will be carried on a substrate (mechanical carrier) of a high temperature stable, electrically insulating material such as cordierite, mullite, etc. A mechanical carrier is preferably comprised of a monolithic magnesium aluminum silicate structure (i.e., cordierite), although the configuration is not critical to the absorbent/catalyst of this invention. It is preferred that the surface area of the monolithic structure provide 50–100 meter square per liter structure, as measured by $N_2$ adsorption. Cell density should be maximized consistent with pressure drop limitations and is preferably in the range of 200–800 cells per square inch of cross-sectional area of the structure. The substrate may be in any suitable configuration, often being employed as a monolithic honeycomb structure, spun fibers, corrugated foils or layered materials. Still other materials and configurations useful in this invention and suitable in an exhaust gas system will be apparent to those skilled in the art in view of the present disclosure.

A washcoat of the material (without the precious metal) may be applied to the substrate and then impregnated with the precursor precious metal solution, if desired. Alternately, the material with precious metal may be washcoated onto the substrate by forming a slurry thereof. Generally, the oxide is provided first on the substrate and then impregnated with a precious metal precursor. Still other ways of providing the invention material for use will be apparent to those skilled in the art in view of the present disclosure, the method not being critical to the present invention. Generally, for use in an exhaust system this impregnated washcoat is subjected to elevated temperatures to decompose and eliminate the functional group of the precious metal precursor. It may be further subjected to calcining. Optimally, the substrate carries a washcoat of the final oxide material in an amount of between about 20% and 40% by weight based on the weight of the substrate (e.g., monolith).

If the material is placed in use in an exhaust gas conduit, oxygen present in the exhaust gas will oxidize any precious metal like platinum to platinum oxide which at high temperatures decomposes to platinum and oxygen. Thus it often exists as a mixture of platinum and its oxides.

We have found that the present invention materials made by sol-gel techniques from heterometallic alkoxides provides several improvements over conventional catalyst materials where a metal is merely loaded on conventional zirconia as by impregnation from solution. In one aspect, the sol-gel processed materials are more resistant to sulfur poisoning. We believe this is because using the alkoxide materials offers a better distribution of alkali metals, alkaline earths, and lanthanides in zirconia than impregnation methods. And the particle size of the oxides of alkali metals, alkaline earths and lanthanides remains small compared to that provided by an impregnation method. This provides a larger number of reaction sites for the reaction of nitrogen with the oxides which increased the opportunity for these components to be oxidized and then trapped. In another aspect the invention materials are more stable to temperature cycling as occurs during engine operation because, we believe, a better distribution of alkali metals, alkaline earths, and lanthanides in zirconia slows down the sintering of the NOx trap formulation. Sintering leads to phase transformation of zirconia based materials into high temperature phases. This is accompanied with the loss of surface area. For precious metals, sintering involves thermally induced migration and coalescence of the noble metal particles which causes a decrease in surface to volume ratio leaving fewer catalytic atoms or molecules on the surface of the crystal available to the reactants.

Further, because the product is made by sol-gel techniques the final product comprises oxides which are joined by chemical bonds to one other in the zirconia matrix. We believe this chemical bonding of the metal leads to the formation of high surface area zirconia materials, e.g., the alkaline earth or lanthanide being bonded to zirconium through oxygen. This prevents collapse of the pores in zirconia and the formation of zirconium-oxygen-zirconium bonds since zirconium-hydroxy bonds on the surface have been replaced with zirconium bonds with, e.g., alkaline earths or lanthanides. However, neither the validity nor understanding of the theories discussed above are necessary for he practice of the invention.

EXAMPLE 1

$Ba[Zr_2(O^iPr)_9]_2$ is prepared according to an embodiment of the present invention by heating a suspension of barium metal (0.537 g) and zirconium isopropoxide (6.06 g) in isopropanol under reflux till all of the barium metal dissolves. The resulting Ba[Zr$_2$(O$^i$Pr)$_9$]$_2$(6.60) is mixed with Zr(OR)$_4$.ROH (1.49) and added to 80 ml water at 80° C. with stirring. A gel forms immediately. The volatiles are removed by evaporation at 90° C. to obtain BaO.nZrO$_2$ Xerogel. The BET surface area of the powder is 62 m$^2$/g and the BJH pore diameter is 4.4 nm.

EXAMPLE 2

Ba[Zr$_2$(O$^i$Pr)$_9$]$_2$ is prepared according to an embodiment of the present invention by heating a suspension of barium metal (0.269 g) and Zirconium isopropoxide (3.04 g) in isopropanol under reflux till all of the barium metal dissolves. The resulting Ba[Zr$_2$(O$^i$Pr)$_9$]$_2$ (3.07) is mixed with Zr(OR)$_4$.ROH (5.45) and added to 80 ml water at 80° C. with stirring. A gel forms immediately. The volatiles are removed by evaporation at 90° C. to obtain BaO.nZrO$_2$ Xerogel. The BET surface area of the powder is 165 m$^2$/g and the BJH pore diameter is 8.6 nm. (10%). FIG. 1 is a graph showing X-ray powder diffraction of the BaO.ZrO$_2$ of this example. It corresponds to a cubic phase of zirconia. X-ray powder diffraction shows only zirconium oxide crystallized in a cubic phase while the barium oxide remains amorphous and part of zirconium oxide matrix (FIG. 1). The particle size of the crystalline chase is 10 nm.

EXAMPLE 3

Figure 2:
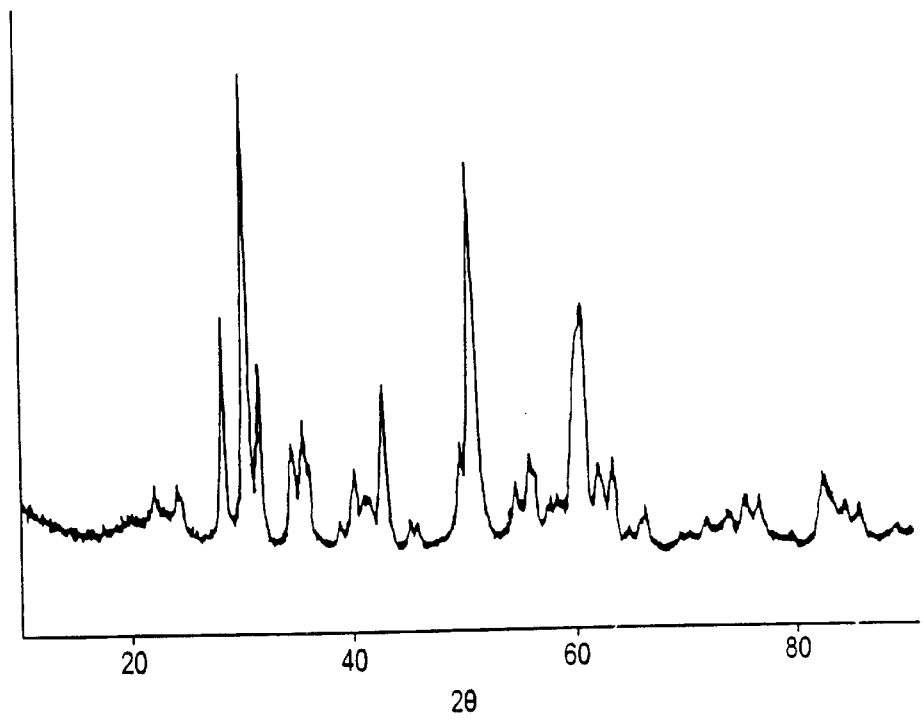
FIG. 2 is a graph showing X-ray powder diffraction of $Li_2O$—$ZrO_2$

Li[Zr$_2$(O$^i$Pr)$_9$] is prepared according to an embodiment of the present invention by heating a suspension of lithium metal (0.076 g) and zirconium isopropoxide (8.491 g) in isopropanol under reflux till all of the lithium metal dissolved. The resulting Li[Zr$_2$(O$^i$Pr)$_9$] (7.89 g) is mixed with LiO$^i$Pr (0.6 g) and added to 80 ml water at 80° C. with stirring. A gel formed immediately. The volatiles are removed by evaporation at 90° C. to obtain Li$_2$O.nZrO$_2$ Xerogel. Gel is fired at 600° C. to obtain Li$_2$O—ZrO$_2$ materials. The BET surface area of the powder is 36 m$^2$/g and the BJH pore diameter is 28.3 nm. X-ray powder diffraction of Li$_2$O.ZrO$_2$ shows sharp diffraction peaks (FIG. 2).

EXAMPLE 4

A solution of Ba(O$^i$Pr)$_2$ (1.02 g), Li(O$^i$Pr) (5.58 g), LiZr$_2$(O$^i$Pr)$_9$ (1.43 g), and Ce(O$^i$Pr)$_4$ (1.7 g) is suspended in isopropanol and heated under reflux. The resulting mixture was added to 70 ml of water at 80° C. The volatiles were allowed to evaporate and the residual powder was collected and pyrolyzed at 600° C.

We claim:

1. A metal-zirconium oxide material made by sol-gel techniques from alkoxides including heterometallic alkoxide comprising:
    (I) at least one heterometallic alkoxide selected from the group consisting of:
        (a) alkali metal-zirconium alkoxides having the general chemical formulas: M[Zr(OR)$_5$], M[Zr$_2$(OR)$_9$], or M$_2$[Zr$_3$(OR)$_{14}$], where M is an alkali metal; and
        (b) alkaline earth metal-zirconium alkoxides having the general chemical formulas: M'[Zr$_2$(OR)$_9$]$_2$, or M'[Zr$_3$(OR)$_{14}$], where M' is an alkaline earth metal;
    (II) lanthanide-zirconium alkoxides selected from the group consisting of:
        Ln[Zr$_2$(OR)$_9$]$_2$, where Ln is a lanthanide;
    wherein the metal-zirconium oxide material comprises zirconium oxide in the range of 40–87 wt. %; alkali metal oxide and alkaline earth metal oxide in the range of 3–30 wt. %; and lanthanum oxide in the range of 10–30 wt. %;
    wherein M and M' are uniformly distributed; and
    wherein the zirconium oxide, alkali metal oxide, alkaline earth metal oxide and lanthanum oxide are joined by chemical bonds to one another.

2. The metal-zirconium oxide material according to claim 1 wherein said alkali metal (M) is selected from the group consisting of lithium, sodium, potassium, and cesium, said alkaline earth metal (M') is selected from the group consisting of barium, calcium, and strontium, and said lanthanide (Ln) is selected from the group consisting of lanthanum and cerium.

3. The metal-zirconium oxide material according to claim 1 which includes oxides of zirconium and alkali metal.

4. The metal-zirconium oxide material according to claim 1 which includes oxides of zirconium and alkaline earth metal.

5. The metal-zirconim oxide material according to claim 1 which includes oxides of zirconium, alkali metal and alkaline earth metal.

6. The metal-zirconium oxide material according to claim 1 which further includes at least 0.1 wt. % precious metal selected from the group consisting of platinum, rhodium, palladium, and a mixture thereof, either incorporated in the metal-zirconium oxide material during processing by sol-gel techniques or deposited on the metal-zirconium oxide material.

7. The metal-zirconium oxide material according to claim 1 where said alkoxides further include an alkoxide selected from the group consisting of zirconium alkoxide, alkali metal alkoxide, alkaline earth alkoxide, and lanthanide alkoxide.

8. The metal-zirconium oxide material according to claim 1 made by sol-gel techniques including reacting water and said alkoxides.

9. The metal-zirconium oxide material according to claim 8 wherein said techniques include:
    forming a reaction mixture from water and said alkoxides; and
    adding acid to said reaction mixture to form a sol.

10. The metal-zirconium oxide material according to claim 9 wherein said technique further comprises heating said reaction mixture prior to the addition of said acid.

* * * * *